H. CHRISMAN.
GAS METER.
APPLICATION FILED MAY 4, 1908.

933,159.

Patented Sept. 7, 1909.
4 SHEETS—SHEET 1

WITNESSES:

INVENTOR.
BY
ATTORNEY IN FACT.

H. CHRISMAN.
GAS METER.
APPLICATION FILED MAY 4, 1908.

933,159.

Patented Sept. 7, 1909.
4 SHEETS—SHEET 4.

WITNESSES:

INVENTOR.
Horace Chrisman
BY
his ATTORNEY IN FACT.

UNITED STATES PATENT OFFICE.

HORACE CHRISMAN, OF EDGEWOOD PARK, PENNSYLVANIA, ASSIGNOR TO PITTSBURG METER COMPANY, A CORPORATION OF PENNSYLVANIA.

GAS-METER.

933,159.  Specification of Letters Patent.  Patented Sept. 7, 1909.

Application filed May 4, 1908. Serial No. 430,708.

*To all whom it may concern:*

Be it known that I, HORACE CHRISMAN, a citizen of the United States, and a resident of Edgewood Park, in the county of Allegheny and State of Pennsylvania, have made a new and useful Invention in Gas-Meters, of which the following is a specification.

This invention relates to gas meters and particularly to meters employing reciprocating diaphragms actuated by the gas passing through the meter and which operate the distributing valves and the registering apparatus of the meter.

An object of this invention is the production of a meter having a cast iron case and which is accurate and durable and cheap to manufacture.

A further object is the production of an improved arrangement for the distributing valves of the meter and the reducing mechanism of the registering apparatus.

A further object is the production of a four-measuring-chamber gas meter employing a new and improved arrangement of distributing valves and valve operating mechanisms.

The meter embodying my invention consists of an exterior casing formed in four distinct parts; a body portion, two side covers and a top cover. The chamber inclosed by the body portion and the two side covers is divided into four measuring chambers by means of two reciprocating diaphragms and a stationary partition. The top cover incloses the distributing chamber from which gas is delivered to each of the four measuring chambers and it is also provided with the main gas inlet port and main gas outlet port, which respectively communicate with the gas main and the gas distribution system. The delivery of gas to and from the four measuring chambers is controlled by two slide valves located within the distributing chamber and actuated, in conjunction with the registering apparatus, by the reciprocating diaphragms.

Figure 1:
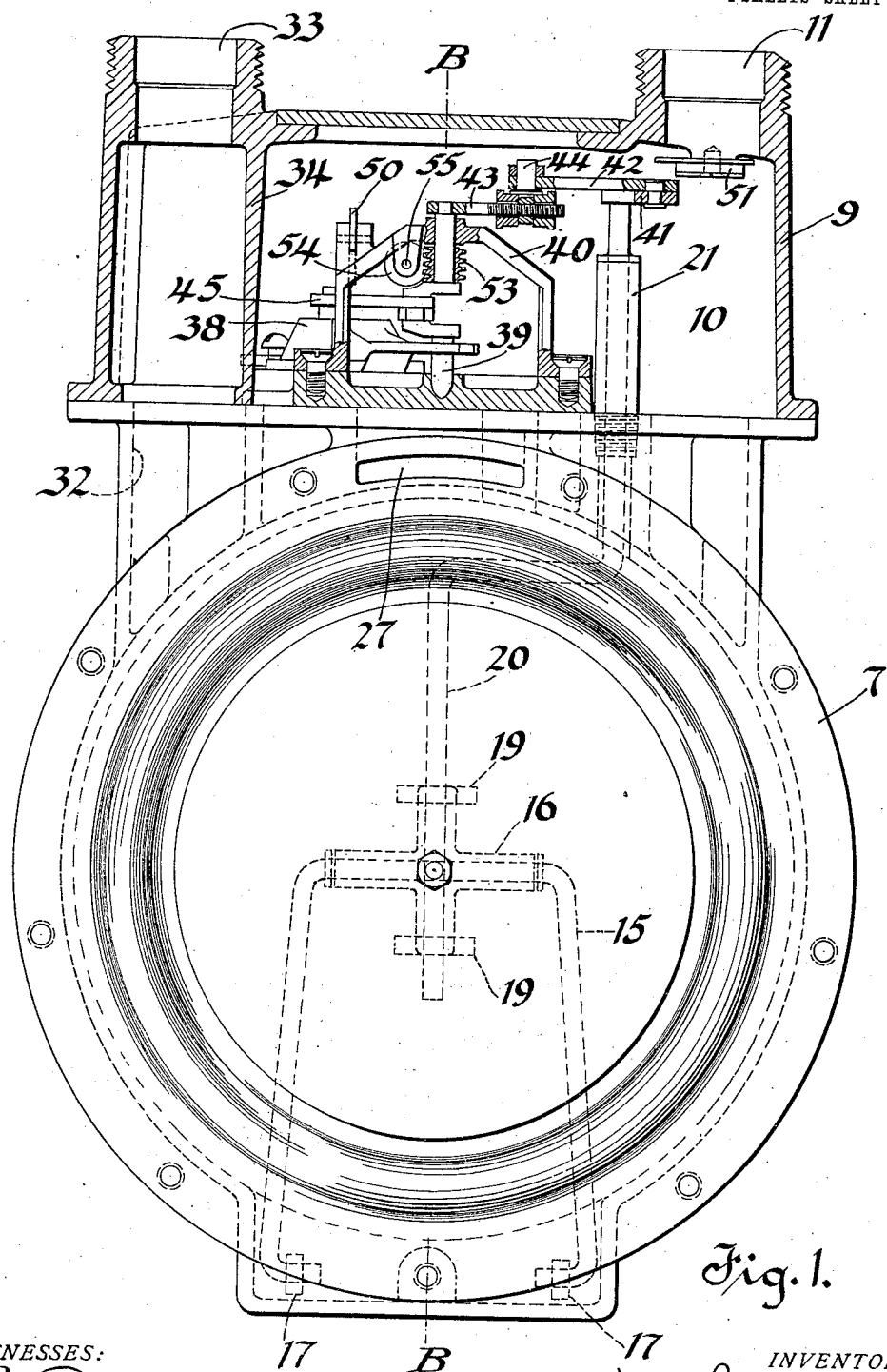
Figure 2:
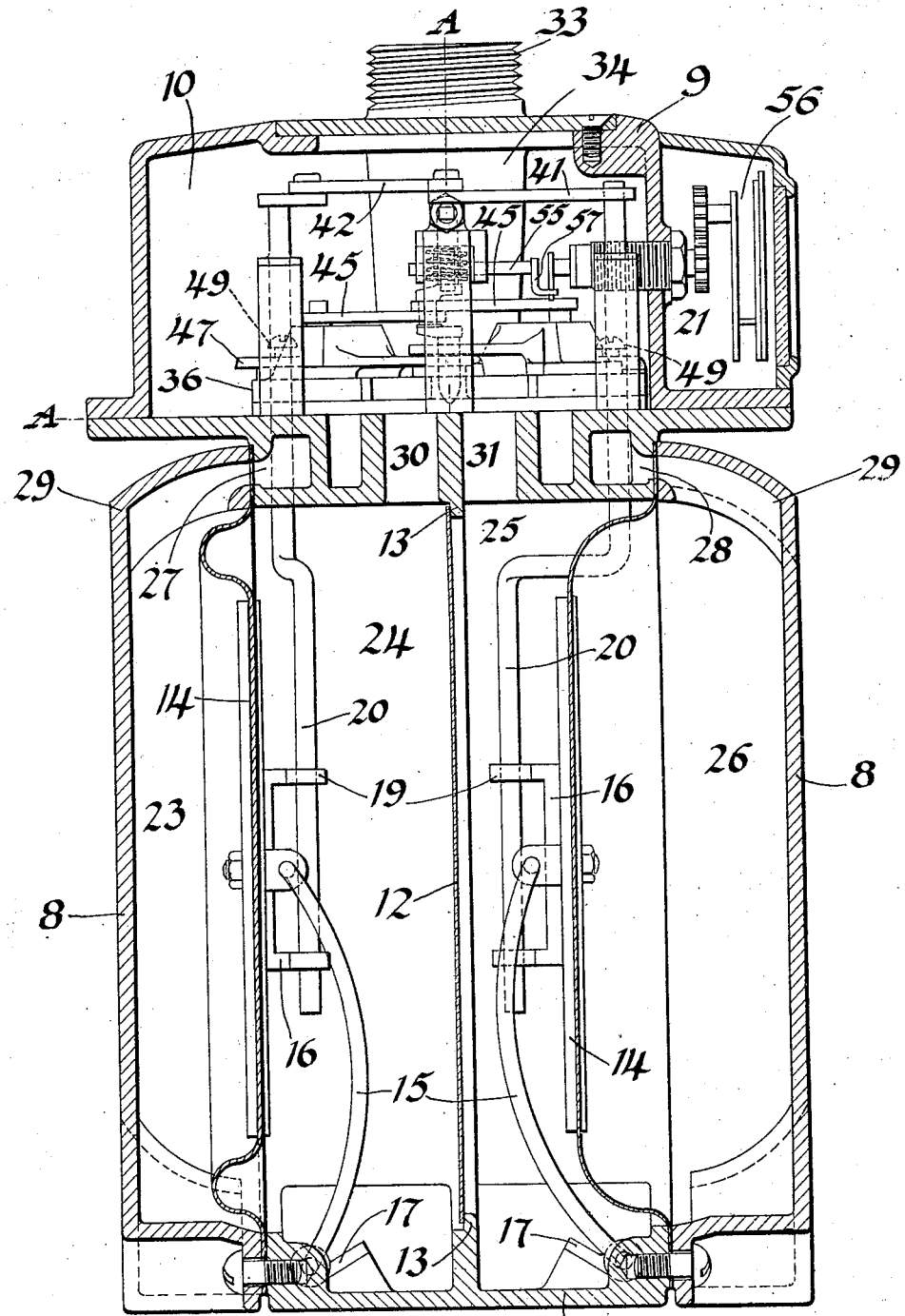
Figure 3:
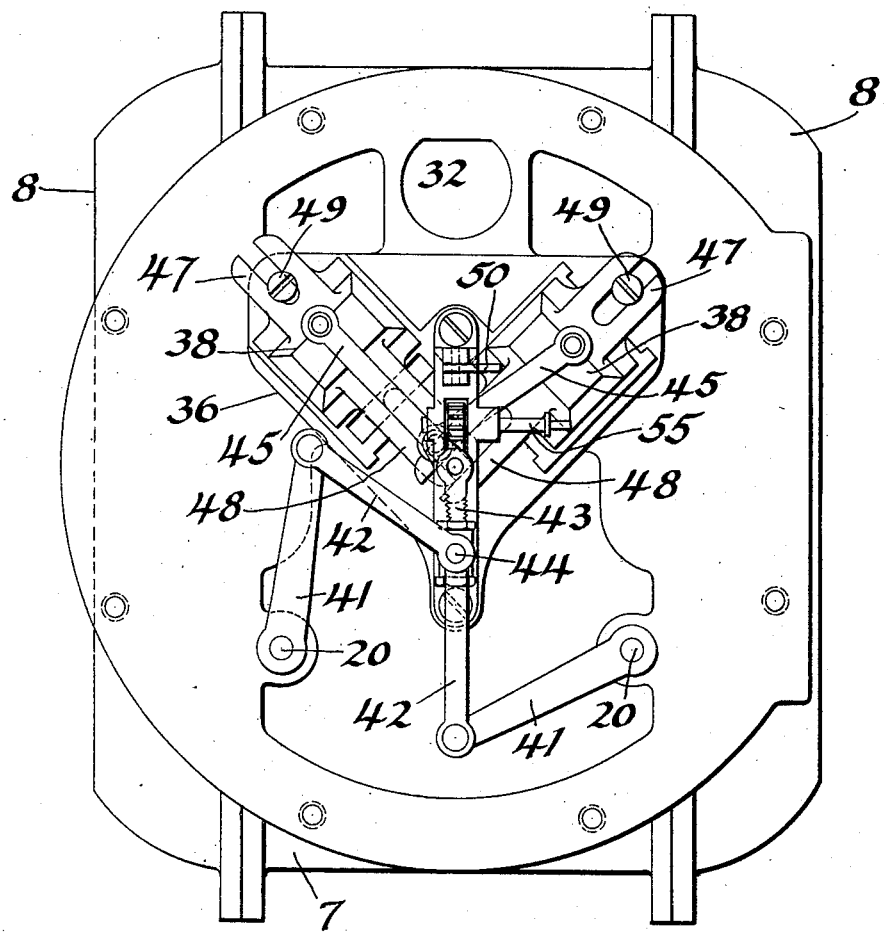
Figure 4:
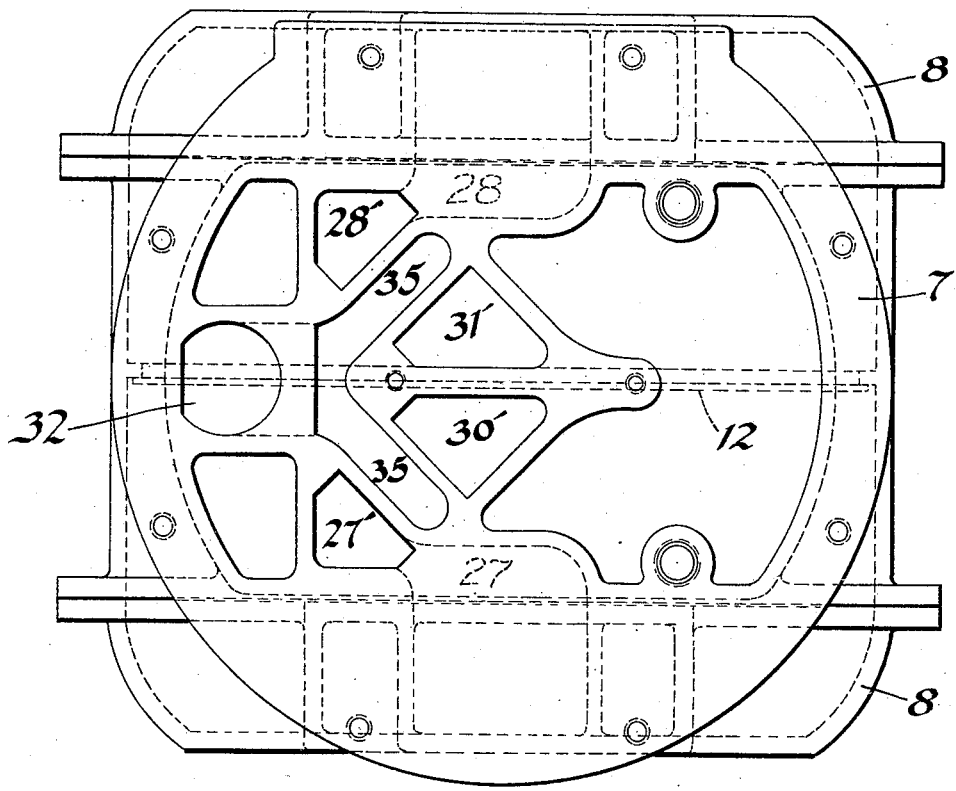
Figure 5:
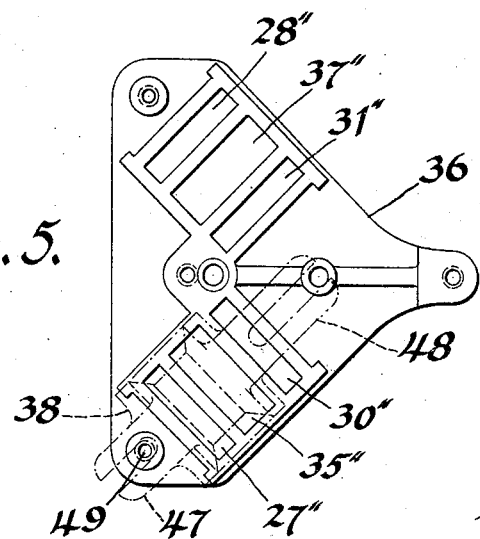

Referring to the drawings accompanying this application and forming a part thereof: Figure 1 is a partial sectional elevation along the line A A of Fig. 2, in connection with a partial side elevation of a meter with one side cover removed; Fig. 2 is a section along the line B—B of Fig. 1; Fig. 3 is a plan view of the meter with the top cover removed; Fig. 4 is a plan view of the body portion and the side covers of the meter; and Fig. 5 is a valve seat plate which forms a detail of my invention.

The meter casing consists of a body portion 7, two side covers 8 and a top cover 9 detachably or removably secured to the body portion. The top cover 9, in conjunction with the body portion, incloses a distributing chamber 10 to which gas is admitted through a main inlet port 11, provided in the top cover. The side covers 8 are secured to each side of the body portion 7 and, in conjunction with the body portion, inclose a chamber which is divided into two equal and similarly shaped compartments by means of a partition 12. The partition 12 is preferably constructed of sheet iron and secured by any suitable means to a flange 13 formed integrally with the walls of the body portion 7 and located midway between the side covers 8. Each of the compartments, formed by the partition 12, is divided by a reciprocable diaphragm 14 into two measuring chambers, thereby dividing the space inclosed within the body portion into four measuring chambers. The diaphragms 14 are formed partially of flexible leather and partially of sheet iron or some other relatively stiff material and are circular in shape. The outer edge of each diaphragm, that is, the flexible portion, is firmly clamped between the body portion and one side cover 8 and each diaphragm is suspended from the wall of the body portion by means of a guide wire 15. Each guide wire is more or less U shaped and is pivotally secured, midway between its ends, to a guide bracket 16, secured to one of the diaphragms 14 at or near its center. Each end of each guide wire 15 is pivotally mounted in a bracket 17, formed integrally with or rigidly secured to the body portion.

Each guide bracket 16 is provided with two vertically alined lugs 19 provided with elongated holes through which the lower end of one of two flag wires 20 extends. The flag wires 20 extend from the inner measuring chambers, upwardly through the walls of the body portion and project into the distributing chamber 10, in which tubular bearings 21, mounted on the body portion 7, are provided for each wire.

The tubular bearings 21 may, if desired, be so constructed that a packing, such as candle wicking, for the flag wires can be provided within their casings to pack the joint between the body portion and the flag wires and to prevent the flow of gas from the distributing chamber through the flag wire bearings and into the measuring chamber. Such a packing is, under some conditions, not essential and for that reason it has not been shown.

The guide wires 15 are connected to the guide brackets 16 so that each diaphragm 14 is capable of turning about the wire 15 which supports it. This objectionable feature, however, is overcome by the flag wires which are so constructed and so connected to the bracket 16 that, while they permit their respective diaphragms to swing about the pivotal connections between the guide wires 15 and the brackets 17, they prevent the diaphragms from turning about the guide wires and hold them in a vertical position throughout their reciprocations.

Each guide bracket 16 is located on the inside of its respective carrying diaphragm 14, that is, it is located within one of the inner chambers formed between a moving diaphragm and the partition 12. This arrangement is advantageous since with it the covers 8 may be removed and the diaphragms 14 replaced without interfering with the adjustment of the valves or the registering mechanism.

The diaphragms 14 and the stationary partition 12 form the four measuring chambers, which, for convenience of description I respectively designate in the drawings as the chambers 23, 24, 25 and 26. Each of these chambers communicates with the distributing chamber 10 by means of a passage formed in the walls of the body portion 7 and through which it receives and delivers gas. The chambers 23 and 26, which are similarly located at each side of the meter between a diaphragm 14 and a cover 8, communicate with the distributing chamber 10 through the respective passages 27 and 28, each of which extend through the body portion 7. Each side cover, however, is offset at 29 and each diaphragm 14 is cut to uncover the lower end of one of these passages. The chambers 24 and 25, which are similarly located between a diaphragm 14 and the stationary partitions 12, communicate with the distributing chamber 10 through the respective passages 30 and 31, which are formed in the body portion.

The ports 27', 30', 31' and 28', shown in Fig. 4, communicate with the respective passages 27, 30, 31 and 28. An exhaust chamber 32 is formed within the body portion and communicates with an exhaust port 33, formed in the top cover, by means of a tubular duct 34 formed in the top cover and which projects downwardly into contact with the body portion. The exhaust chamber 32 communicates with a V shaped port 35, one leg of which is located between the ports 27' and 30' and the other leg of which is located between the ports 28' and 31'.

A valve seat plate 36 (Fig. 5) is secured to the body portion 7 and is provided with ports arranged in two sets and which communicate with the ports formed in the top of the body portion. Ports 27'', 35'' and 30'' are included in one set of the ports of the plate 36 and communicate respectively with the ports 27', 35 and 30' and consequently with the measuring chamber 23, the exhaust chamber 32 and the measuring chamber 24. Ports 31'', 37'' and 28'' are included in the other set of ports of the plate 26 and respectively communicate with the ports 31', 35 and 28' and consequently with the measuring chamber 25, the exhaust chamber 32 and the measuring chamber 26. The ports of one set communicate with the measuring chambers located on one side and the ports of the other set communicate with the measuring chambers located on the other side of the stationary partition 12. Each set of ports is provided with a slide valve 38 which operates to control the delivery of gas to and from the measuring chambers.

A vertically disposed crank shaft 39 is journaled at its lower end in the plate 36 and at the upper end in a frame 40, which is secured to the plate 36. The valves, the crank shaft, the frame 40 and the reducing mechanism for the registering apparatus, which will be hereinafter described, are all secured to the valve seat plate 36. This arrangement is advantageous for the reason that the valves are more easily adjusted than would be the case if each valve had an independent seat. Less difficulty is also encountered in maintaining the alinement of the reducing mechanism than would be the case if the frame 40 were independently secured to the body portion. The crank shaft is rotated by the flag wires 20 through the agency of flag arms 41 and flag arm links 42. A flag arm 41 is secured to the upper end of each flag wire and a flag arm link 42 is pivotally secured to the outer or free end of each arm 41. A tangent arm 43 is rigidly secured to the crank shaft 39 and is provided with a standard 44 adjustable longitudinally of the arm 43 and to which the links 42 are pivotally secured.

The distributing valves 38 are simple D or slide valves which reciprocate on their seats and alternately connect each measuring chamber with the distribution chamber and the discharge chamber. Each valve 38 controls the delivery of gas to and the discharge of gas from the two measuring chambers located on one side of the partition 12 and is reciprocated by the crank shaft 39 through the agency of a valve link

45 pivotally secured to a suitable pin or lug formed on the valve. Each valve 38 is provided with bifurcated projecting arms 47 and 48, which respectively coöperate with a screw 49 secured to the plate 36 and the crank shaft 39 below the crank arms to maintain the valves in proper alinement during their reciprocations. The flag wires are so arranged that the crank shaft will never be dead centered. One measuring chamber is always open to the gas pressure within the distributing chamber 10 and one is always discharging into the chamber 35.

A pawl 50 is pivotally mounted on the frame portion 40 and, engaging the tangent arm 43 at each revolution, prevents the meter from being operated in the reverse direction. The gas inlet port 11 is provided with a shield 51 secured to the top cover adjacent to the port and so located as to prevent the operating mechanism from being tampered with by the insertion of wires or other instruments through the port opening.

A worm gear 53 provided on the crank shaft 39 above the crank arms and a worm wheel 54, meshing with the worm 53 and mounted on a shaft 55, suitably journaled in the frame 40, constitute the reducing mechanism of the registering apparatus 56 and is adapted to operate the registering apparatus through the agency of a crank connection 57.

In accordance with the provisions of the patent statutes, I have described the principle of operation of my invention, together with the apparatus which I now consider to represent the best embodiment thereof, but I desire to have it understood that the apparatus shown is only illustrative and that the invention can be carried out by other means.

What I claim is:

1. In a gas meter, an open-ended body portion, a stationary partition dividing the same into two parts, diaphragms closing the ends of the body portion, side covers securing said diaphragms in place and each provided with a chamber said chambers forming with said diaphragms and said partition four alined measuring chambers.

2. In a gas meter, a body portion, a top cover and two side covers secured thereto, a stationary partition located within said body portion between said side covers, a reciprocating diaphragm located between each side cover and said body portion and forming with said stationary partition four measuring chambers, a distributing chamber located within said top cover, a gas delivery port formed within said cover and communicating with said chamber, an exhaust chamber located between said measuring chambers and said distributing chamber, passages provided in said body portion for establishing communication between said measuring, said exhaust and said distributing chambers, two valves located within said distributing chamber for controlling the delivery of gas through said passages, a flag wire secured to each diaphragm and extending upwardly through said body portion into said distributing chamber for operating said valves and an exhaust port provided in said top cover and communicating with said exhaust chamber.

3. In a gas meter, a body portion, a top cover and two side covers secured thereto, a stationary partition located within said body portion parallel to and between said side covers, a reciprocating diaphragm secured to said body portion between each side cover and said body portion, thereby forming, with said stationary partition, four measuring chambers, a distributing chamber located within said top cover, an exhaust chamber located within said body portion between said top cover and said measuring chambers, passages formed within said body portion communicating with said exhaust and said measuring chambers for establishing communication with said chambers and said distributing chamber, distributing valves located within said distributing chamber adapted to control the delivery of gas through said passages, a crank shaft for operating said valves located within said distributing chamber, flag wires operatively connected to the inner face of each diaphragm and extending upwardly through said body portion into said distributing chamber for operating said crank shaft, a gas admission port in said top cover and communicating with the distributing chamber and a gas exhaust port communicating with said exhaust chamber.

4. In a gas meter, a body portion, a top cover and two side covers secured thereto, a stationary partition located within said body portion midway between and parallel to said side covers, a reciprocating diaphragm located at each side of said body portion and secured in place by a side cover, a distributing chamber between said top cover and said body portion, distributing valves located within said chamber, a flag wire operatively connected to the inner face of each diaphragm for operating said valves, and exhaust and delivery ports provided in said top cover.

5. In a gas meter provided with four measuring chambers, an open-ended body portion, two reciprocating diaphragms closing the ends of said body portion, a guide bracket secured to the inner face of each diaphragm, distributing valves for controlling the delivery of gas to and from said measuring chambers, a guide wire for each diaphragm pivotally mounted on said body portion and operatively connected to said guide bracket and a flag wire extending upwardly through the wall of said body portion and operatively connected to said guide bracket.

6. In a gas meter, a body portion, a partition located centrally of the body portion, a diaphragm located on each side of said partition, detachable side covers securing said diaphragms in place, the partition, diaphragms and covers forming four alined measuring chambers, registering mechanism and valves and means secured to the inner side of said diaphragms for operating said valves and registering mechanism.

7. In a gas meter, a body portion, a partition located centrally of said body portion, a reciprocating diaphragm located on each side of said partition, detachable side covers securing said diaphragms in place, the partition, diaphragms and covers forming four alined measuring chambers, registering mechanism and valves and means located within the two inner measuring chambers and connected to the inner side of said diaphragms for operating said registering mechanism and valves.

8. In a gas meter a casing including a gas distributing chamber and four measuring chambers, two valves controlling the delivery of gas to and from the measuring chambers, a valve-seat plate provided with ports communicating with each of said chambers and supporting both of said valves and a valve operating mechanism mounted on said plate.

9. In a gas meter, in combination with a meter casing, four measuring chambers, two valves controlling the delivery of gas to and from said chambers, a valve-seat plate for both of said valves and provided with ports communicating with each of said chambers, an operating shaft for said valves mounted on said plate and a reducing mechanism for the registering apparatus of the meter secured to said plate.

10. In a gas meter, a body portion, a top portion secured thereto, a partition located centrally within the body portion, detachable covers for the ends of the body portion, reciprocating diaphragms secured between the ends of the body portion and said covers and with said partition and said covers forming four alined measuring chambers, valves and registering mechanism located in the top portion and operating means for said valves and registering mechanism located within the two chambers adjacent said central partition and having operative connection with said diaphragms.

11. In a gas meter, a body portion, a partition located centrally within said body portion, covers for said body portion detachably secured thereto, diaphragms secured against the ends of the body portion by means of said covers and forming with the partition and said valves four measuring chambers, a top portion secured to the body portion, two valves controlling the passage of gas to and from said measuring chambers, gas distributing ports formed in the body portion, registering mechanism and means for operating said valves and said registering mechanism through the agency of said diaphragms located within the two inner measuring chambers and having operative connection with said diaphragms.

12. In a gas meter, a body portion having open ends and a centrally-located partition, chambered side covers detachably secured to said body portion and reciprocating diaphragms secured between said side covers and said body portion.

In testimony whereof, I have hereunto subscribed my name this 29th day of April, 1908.

HORACE CHRISMAN.

Witnesses:
CHARLES W. McGHEE,
E. W. McCALLISTER.